United States Patent [19]
Hartmann et al.

[11] Patent Number: 5,653,815
[45] Date of Patent: Aug. 5, 1997

[54] PROCESS FOR SOLID-LIQUID EXTRACTION AND EXTRACTION TOWER FOR CARRYING OUT THE PROCESS

[75] Inventors: Heinrich Hartmann; Dieter Hellmig; Siegfried Matusch, all of Brunswick; Guenter Pohner, Vechelde; Guenther Ross, Klein-Denkte; Florian Sosnitza, Brunswick, all of Germany

[73] Assignee: Braunschweigische Maschinenbauanstalt AG, Brunswick, Germany

[21] Appl. No.: 416,328

[22] Filed: Apr. 4, 1995

[30] Foreign Application Priority Data

Apr. 8, 1994 [EP] European Pat. Off. ......... 94 105 491.8

[51] Int. Cl.[6] .................. C13D 1/12; B01J 3/00; B01D 11/04; B01D 3/00
[52] U.S. Cl. ............... 127/5; 127/2; 127/3; 127/6; 127/7; 127/43; 422/285; 422/287; 422/257; 422/271
[58] Field of Search .................. 127/2, 3, 5–7, 127/43; 422/261, 275, 257, 258, 259, 271, 273, 276, 277, 269, 285, 287

[56] References Cited

U.S. PATENT DOCUMENTS

Re. 31,913  6/1985  Barger ..................... 422/275
1,570,854  1/1926  Nordell ..................... 422/261
1,721,858  7/1929  Eddy ........................ 422/273
2,551,815  5/1951  Schulz ...................... 422/258
2,577,135  12/1951 Langen ..................... 422/273
2,637,666  5/1953  Langen ..................... 422/273
2,726,939  12/1955 Andrews .................... 422/261
2,762,510  9/1956  Gwyn, Jr. et al. .......... 422/261
2,857,907  10/1958 Kaether et al. ............. 422/273
3,143,395  8/1964  Milmore .................... 422/258
3,629,002  12/1971 Kaether et al. ............. 422/277
3,880,667  4/1975  Straube .................... 127/7
4,115,145  9/1978  Dietzel et al. ............. 127/5
5,267,936  12/1993 Miachon .................... 422/258

FOREIGN PATENT DOCUMENTS 1210682  3/1960  France ................. C13D 1/10
2197631  3/1974  France ................. B01F 1/00
1124922  3/1962  Germany ............... C13D 1/12
7439969  7/1976  Germany ............... C13D 1/12
7607097  6/1977  Germany ............... C13D 1/12
4233680  12/1993 Germany ............... C13D 1/12
1053847  11/1983 Greece ................. 422/275

*Primary Examiner*—Glenn A. Caldarola
*Assistant Examiner*—Patricia L. Hailey
*Attorney, Agent, or Firm*—W. G. Fasse; W. F. Fasse

[57] ABSTRACT

In a process for solid-liquid extraction, in particular of sucrose from beet cossettes, countercurrent extraction in an extraction tower is employed. The tower juice is drawn off together with the small-sized solid constituents obtained in the process, such as sand, essentially exclusively via side screens.

35 Claims, 5 Drawing Sheets

PROCESS FOR SOLID-LIQUID EXTRACTION AND EXTRACTION TOWER FOR CARRYING OUT THE PROCESS

BACKGROUND OF THE INVENTION

1. Field of the Invention

The invention relates to a process for solid-liquid extraction, in particular of the sucrose from beet cossettes, using countercurrent extraction in an extraction tower, from which tower juice is drawn off via screens, and to an extraction tower for carrying out the process.

2. Description of the Related Art

Processes for solid-liquid extraction are known, for example, in the case of the countercurrent extraction of sucrose from beet cossettes using an extraction tower as described in German Patent Publication 4,233,680, German Utility Model 7,607,097, and German Utility Model 7,439, 969. In the case of such a known process, the fresh beet cossettes are firstly supplied to a so-called cossette mixer for warming up and denaturation. This cossette mixer is a combination of an apparatus for heating and stirring beet cossettes. It makes possible the extraction of raw juice having a temperature which is very favourable microbiologically. The raw juice is produced upon the warming and denaturation of the beet cossettes. By these means, the cell protoplasm is partly destroyed and the escape of the raw juice made possible. On completion of this denaturation process, the beet cossettes are supplied to an extraction tower for further processing and extraction of the sucrose by means of cossette pumps. The extraction tower includes a central shaft, equipped with conveying vanes for conveying the beet cossettes within the tower, and various connection pieces for feeding and discharging liquids and solid constituents, such as, for example, beet cossettes. The extraction of the sugar from the beet cossettes is effected by the countercurrent method with the exclusion of air. In this method, the beet cossettes are conveyed in a direction opposite, i.e. as a countercurrent to, a flow of press water and fresh water that is introduced into the tower. The press water and fresh water extract the sucrose and other soluble substances from the beet cossettes. The press water is produced by being pressed out from beet cossettes. The fresh water is a mixture of hot and cold water. In the case of known extraction towers, the extraction tower and a countercurrent cossette mixer are used in combination.

By directing beet cossettes and press and fresh water in counter-current directions, that is conveying the beet cossettes from the bottom upwards and conveying the water from the top downwards, the sucrose is dissolved out of the beet cossettes. One resulting product is a water-like liquid enriched with the sucrose, i.e. the so-called tower juice. Another product results as an extraction residue from the beet cossettes, i.e. the so-called pulp. This is the marc of the beets and can be withdrawn through a connection piece arranged at the top of the extraction tower. The drawing-off of the tower juice from the extraction tower is effected mainly via a floor screen and additionally partly through side screens. The drawn-off tower juice is directed via sand catchers, which free the juice from any solid constituents still present in the tower juice, such as sand and soil from the raw beets. These solid constituents are not removed already during the sucrose extraction in the extraction tower, but instead are drawn off together with the tower juice. The tower juice is then usually supplied to a countercurrent cossette mixer.

The floor screen used in the known extraction towers is centrally supported, it being possible to pump a mixture of beet cossettes and raw juice into the extraction tower at the same time through a lateral opening of the central support. In this arrangement, the floor screen extends over the major part of the diameter of the tower casing and is usually composed of a plurality of partial screens.

In the known arrangement, solids continually settle on the floor screen owing to the direction of flow and thus clog the screens. Therefore wipers are mounted on the rotating shaft so that the wipers continually glide over the floor screen and detach the solids from the screen and supply them to the conveying path again.

OBJECT OF THE INVENTION

The object on which the invention is based is to provide an improved process and an improved extraction tower for solid-liquid extraction, in particular of the sucrose from beet cossettes, using countercurrent extraction in an extraction tower, from which tower juice is drawn off via screens.

SUMMARY OF THE INVENTION

The above object is achieved by the invention, which includes a process for solid-liquid extraction, an extraction tower suitable for carrying out the process, and a side screen construction suitable for use in the extraction tower. According to the invention, an extraction tower is achieved in which the hitherto necessary floor screen, which required costly constructions on account of the changing weight loads and the hitherto necessary avoidance of screen clogging, can essentially be dispensed with. Furthermore, such a tower can be produced even more cost-effectively by using larger structural units, such as a special side screen construction according to the invention. The method of the invention especially involves conveying through an extraction tower a raw material and unavoidable solids as a countercurrent to a liquid flow, and then withdrawing at least essentially all of the resulting tower juice and at least some of the fine solids through the side screens of the tower. Thus, the substantial withdrawal of juice through floor screens is avoided.

The hitherto used floor screen is, in fact, replaced in the invention by an essentially closed, load-carrying and rigid floor part of floor pan which, in turn, makes possible the use of an optimal standing shell. Also the danger of infection recesses in which tower juice or solid constituents in the tower juice may collect and infect the newly resulting tower juice is diminished.

In principle, a process is specified and an extraction tower for solid-liquid extraction is provided in which the tower juice and the small-sized solid constituents present therein, referred to as solids hereinafter, are drawn off essentially via side screens. Small-sized solids in the case of the extraction of sugar beets means, for example, sand. The drawing-off of the tower juice essentially only via the side screens is in complete contrast to known processes, in which side-screen elements perform essentially only auxiliary functions. The tower juice is drawn off from the extraction tower at a predetermined rate. This means that the drawing-off rate can be manually preset or can be varied in accordance with the extraction process. In the case of regulation of the extraction process, the drawing-off rate can be adjusted, for example, by valves or slide elements. An automatic, e.g. electric, hydraulic, etc., follow-up control may also be employed.

Solids which are obtained during the solid-liquid extraction, if they are small enough, are drawn off with the tower juice via the side screens. Larger constituents and smaller constituents not entrained by the tower juice sink to the floor. As a result of measures such as the swirling of juice occurring or brought about even in the region of the floor and side screens of the extraction tower, the solid constituents are continually swirled up in the tower juice. As a result, the smaller constituents that are already settling can also be entrained in the tower juice once again to be drawn off therewith. The swirling in the floor region is produced, on the one hand, by conveying vanes arranged on a central shaft and intended for conveying, for example, the beet cossettes in a countercurrent direction to press and fresh water that is admitted further up in the extraction tower. On the other hand, it is excited by wipers for example in the form of shovel-like, obliquely set parts, e.g. of metal, or of high-strength plastic or the like. The wipers skim over the floor of the extraction tower and thus swirl up the solids. The swirling in the region behind the side screens is brought about, for example, by continually changing the directions of flow by opening different drawing-off paths.

If necessary, it is possible, for example in the case of particularly large quantities of solids settling on the floor part and/or in the case of lower degrees of swirling, to collect a residual quantity of solids, that has not been withdrawn but instead has flowed past the side screens, in the load-carrying floor, for example in pockets specially designed for this purpose. The solids can be withdrawn from these pockets or from this floor part. The solids which are drawn off via the side screens are combined emulsion-like with the tower juice. The withdrawal of the residual quantity of solids from the floor part can be effected manually or automatically via floor openings.

The invention is not only applicable in the exploitation of sugar beets or sugar cane, but also in the case of other products, such as, for example, oleaginous products, cellulose, paper or the like.

DESCRIPTION OF THE DRAWINGS

For a more detailed explanation of the invention, a number of exemplary embodiments of extraction towers for carrying out the process are described hereinafter with reference to the drawings. In these drawings.

DETAILED DESCRIPTION OF EXAMPLE EMBODIMENTS OF THE INVENTION

Figure 1:
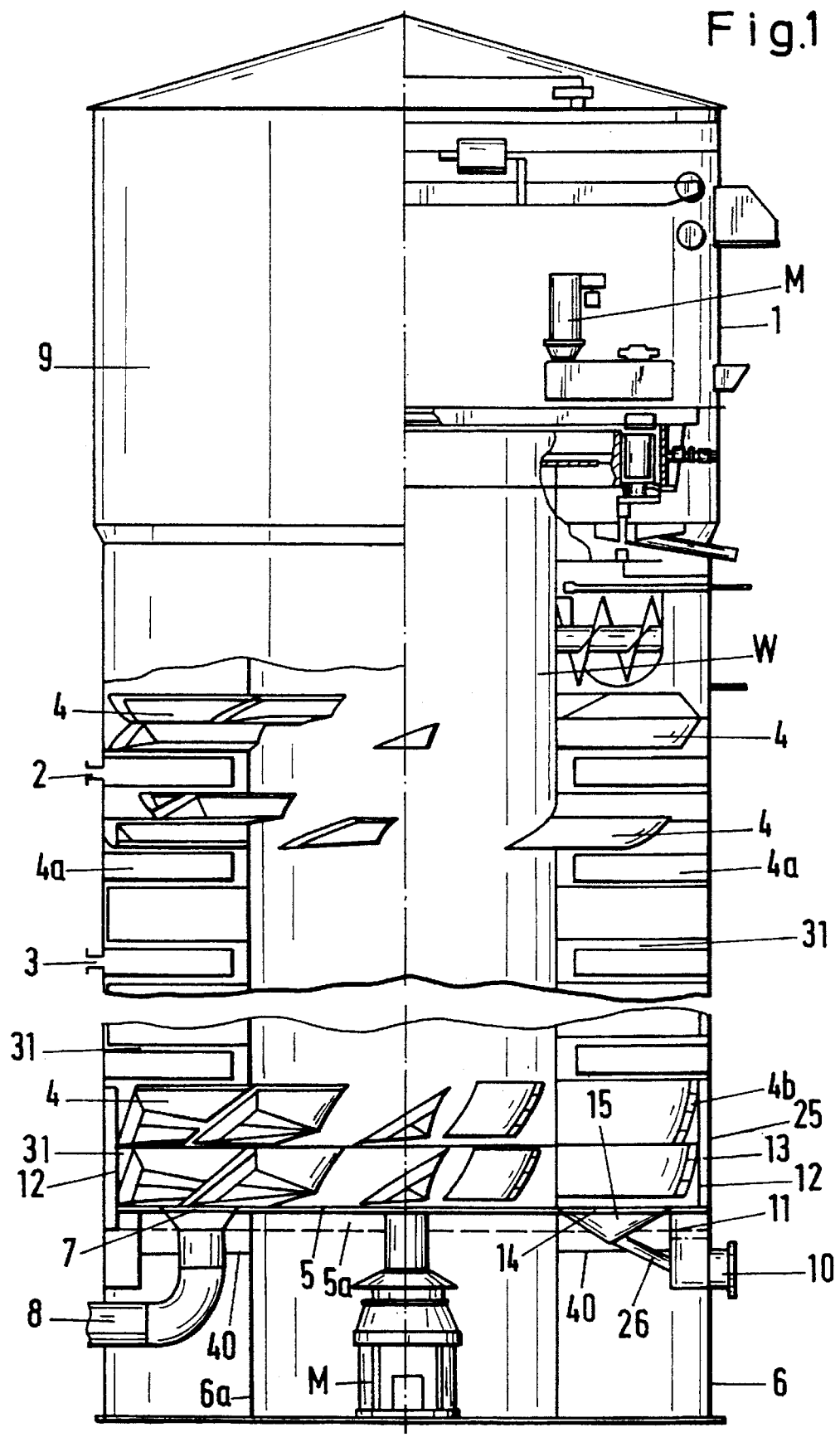
FIG. 1: shows a schematic sectional view of a first embodiment of an extraction tower for solid-liquid extraction.

FIG. 1 illustrates an exemplary embodiment of an extraction tower for solid-liquid extraction. The extraction tower has a cylindrical outer shell 1. Flanged to this outer shell 1 are two filling connection piece levels 2,3, arranged one above the other, for introducing press water and fresh water. Each level has a plurality of connection pieces. Arranged in the inside of the outer shell 1 of the extraction tower on a shaft W are conveying vanes 4 which cooperate with arresting devices 4a to achieve an axial conveying motion of the beet cossettes that have been introduced into the tower as explained below. The conveying vanes 4 and arresting devices 4a are merely shown schematically. The arresting devices 4a are arranged on an outer wall 25 of the outer shell 1, and the conveying vanes are arranged on the central shaft W of the extraction tower. Normally, a plurality of levels of such conveying vanes 4 and arresting devices 4a are employed. The conveying vanes 4 and arresting devices 4a serve, for example, to convey the beet cossettes countercurrently to press and/or fresh water. The shaft W is driven by one or more electrically or hydraulically operated motors M. The latter can be arranged centrally or distributed and be connected or become connected to the shaft W, for example via gearing, a toothed ring or the like.

The outer shell 1 is connected on its underside to a floor part or floor pan 5. The latter is, for example, inserted or is enveloped by the outer shell 1 and, if need be, supported by supporting beams 5a which are, for example, welded to the outer shell 1. The outer shell 1 of the extraction tower rests on one or more standing shells 6,6a or the like. The inner standing shell 6a supports the floor part 5 in order that the latter does not sag in the case of large tower diameters. The walls of the two shells 1 and 6 lie one on top of the other, the floor part 5 and the higher exterior shell parts being built up one after the other on the prepared standing shell or standing shells 6,6a. The point of connection of the two shells 1,6 is provided by means of walls 40 which, for example, may be flanges. Thus, the two shells 1,6 can be connected to one another by means of screws or by welding.

Arranged in an opening 7 in the floor part 5 is a filling connection piece 8 for the mixture of, for example, beet cossettes and tower juice. The feeding-in of the mixture of beet cossettes and juice is effected against the direction of rotation of the conveying vanes 4 on the shaft W. For this purpose, the filling connection piece 8 is preferably provided obliquely in the floor part 5 between the shaft W having the conveying vanes 4 and the outer wall 25 of the outer shell 1 of the extraction tower having the arresting devices 4a arranged there. The filling connection piece 8 is arranged so that the floor part 5 is not weakened. This is achieved, for example, by appropriate apparatus-related dimensioning of the wall thicknesses.

One or more outlet connection pieces 10 for the tower juice are arranged on the right-hand side of the tower illustrated in FIG. 1, i.e. the side located opposite the filling connection piece 8 for the mixture of beet cossettes and tower juice. The outlet pieces 10 lead out of the standing shell 6. The tower juice flows out of the extraction tower via side screens 12 arranged in its lower region and one or more ring-shaped juice spaces 13 into a juice ring channel 11. This juice ring channel 11 is connected to the one or more outlet connection pieces 10. The side screens 12 are arranged along the outer wall 25 of the tower at predetermined distances therefrom. This outer wall 25 is part of the outer shell 1. The conveying vanes 4 reach outward almost to the screens 12 and, above the screens 12, reach up to this wall 25. The conveying vanes 4 have, in the region of the screens 12, movable wipers 4b which continually clean the screens 12. Such wipers 4b are likewise provided on the floor part 5. There, they prevent settling of solids by continually swirling up the solids.

The juice space 13, arranged behind the outer wall 25 and communicating with the interior 31 of the extraction tower through the side screens 12, can be shaped as a ring space running all the way round at the inner side of the outer wall 25 or in the form of separate juice spaces. In general, a separate juice space 13 is arranged behind each screen 12.

In order to attain high flow rates, the juice space or the juice spaces 13 are dimensioned relatively small. By comparison, the juice ring channel 11 is dimensioned larger and designed so that, through the flowing of the juice, deposits are avoided. The rate at which the tower juice is drawn off from the extraction tower can be predetermined. It is manually or automatically adjustable by means of slides, flaps or the like. The control of the slides is effected according to empirical values. An arbitrary alteration of the quantity of tower juice to be drawn off is possible at any time, e.g. in the event of disruption. The slides can be controlled, but also automatically regulated. In this regard, the control or automatic regulation can be effected as a function of the solid-liquid extraction process and its parameters.

In most cases, the action of the side screens and the swirling measures are sufficient to prevent the settling of the solids on the floor part 5 or at least keep settling at a minimum. The small quantities of residual solids that do settle can be removed from time to time, if necessary, through floor openings 14. In FIG. 1 there is arranged underneath the bottom level of the outer shell 1 of the extraction tower a collecting vessel 15 which is preferably fixed to the floor part 5. This collecting vessel 15 is essentially only provided when larger quantities of solids, such as sand, are to be expected. The collecting vessel 15 fixed to the floor part 5 is connected to the interior 31 of the extraction tower by a floor opening 14, usually fashioned in the shape of a segment, in the floor part 5 of the outer shell 1 of the extraction tower. In the process for solid liquid extraction, for example of beet cossettes and juice, solids are obtained. The latter may, on the one hand, be very small beet-cossette parts and, on the other hand, be other organic or inorganic constituents, which adhere to the extraction tower on introduction of the beet cossettes thereinto. Here, this could be, in particular, sand and soil brought along with the beets from the field. These solids are as a rule drawn off together with the tower juice via the side screens 12. The remaining quantity of small-sized solids, here referred to as residual quantity of solids, which flows past the side screens 12, forms a deposit on the floor part 5 of the outer shell 1 of the extraction tower. These collected solids are continually swirled up, during operation, by the wipers 4b and supplied to the side screens once again. Then, any solids still remaining, for example in the case of excessively large quantities of solids being obtained or insufficient swirling by the conveying vanes and wipers, can flow into the collecting vessel 15 through the floor opening 14 or openings. By means of the conveying vanes 4 and the obliquely set, shovel-like, movable wipers 4b, for example made of plastic and arranged against the side screens 12 and on the floor part 5, the solids in the tower juice are swirled so that an emulsion-like mixture is produced. The wipers 4b skim over the smooth floor of the floor part 5 without the danger of catching and tearing out an entire floor screen, as is the case with the known extraction towers having floor screens. The solid can subsequently be withdrawn from the collecting vessel or collecting vessels 15. This withdrawal of the solid takes place in FIG. 1 via the outlet connection piece or outlet connection pieces 10 for the tower juice. The collecting vessel 15 is here connected to the outlet connection piece 10 via a pipe conduit 26. The collecting vessel 15 is in the form of a pointed bowl, and the pipe conduit 26 is connected at a lowest point of the collecting vessel 15. For better advancement of the solids, the pipe conduit 26 runs obliquely downwards into the outlet connection piece 10.

Figure 2:
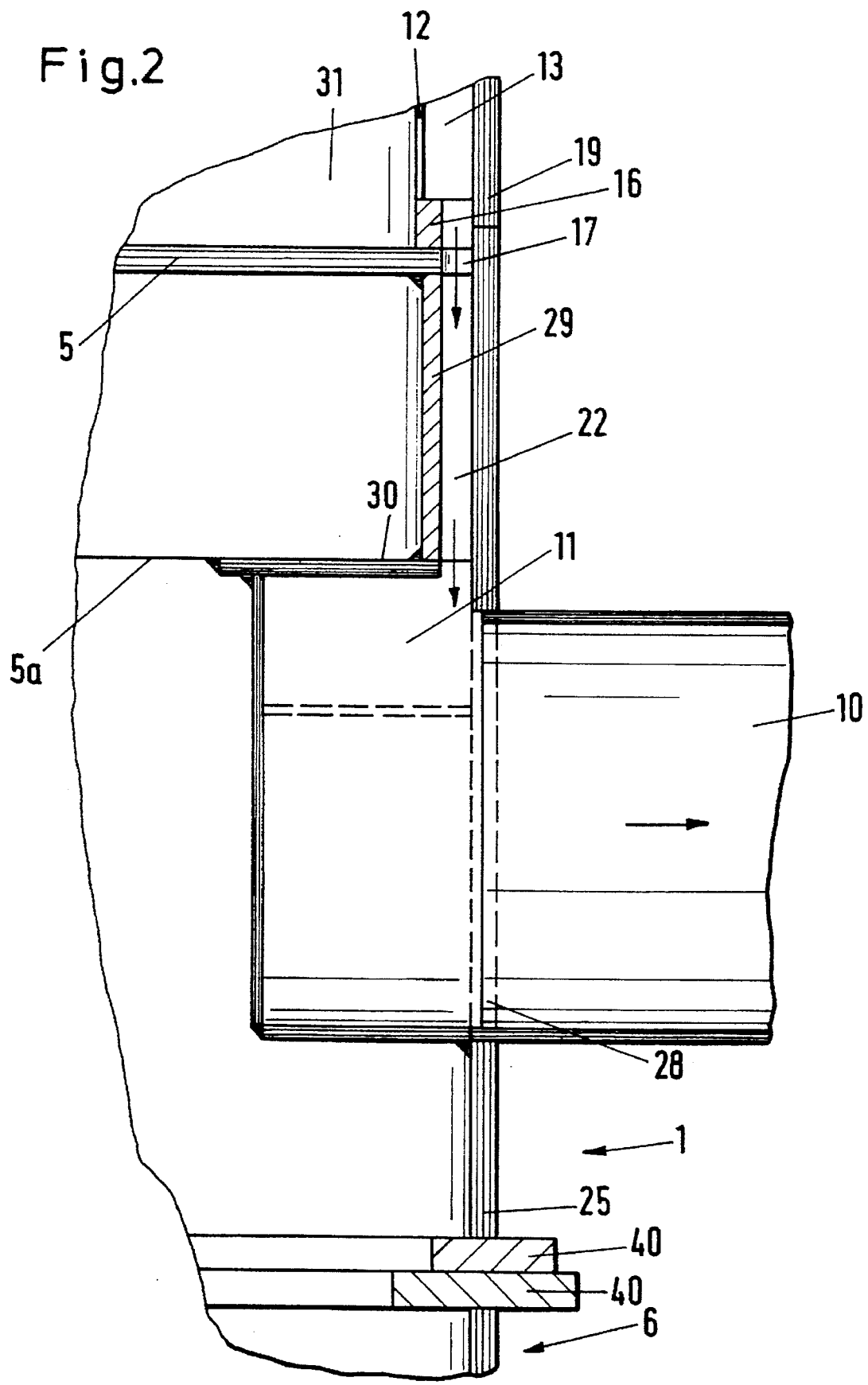
FIG. 2: shows an enlarged detail view of portion of the extraction tower according to FIG. 1, FIG. 3: shows a further enlarged detail view of a second embodiment a portion of an extraction tower for solid-liquid extraction.

FIG. 2 shows a detail view of an outlet connection piece 10 and the side screens 12 arranged thereabove, the juice space 13 and the juice ring channel 11. The black arrow within the outlet connection piece 10 indicates the outlet direction. In each case, an outlet connection piece 10 is fitted into corresponding cutout 28 of the wall 25. The outlet connection pieces 10 are introduced into the juice ring channel 11. The flow cross-section of the juice ring channel 11 determines the rate at which the tower juice flows out of the outlet connection piece 10.

Between the floor part 5 and a wall 30 which belongs to the outlet connection piece arranged therebelow and runs approximately parallel to the floor part 5, a wall part 29 is arranged parallel to the outer wall 25 of the outer shell 1. This wall part 29 forms together with the outer wall 25 of the outer shell 1, juice communication passages 22. In that part of the outer wall 25 arranged thereabove, the side screens 12 are arranged. The wall part 29 inwardly bounds the juice communication passages 22. The latter run, as ring spaces interrupted where appropriate by the supporting beams 5a, between the wall 25 of the outer shell 1 and this wall part 29 and between the floor part 5 and the wall 30 parallel thereto. The upper boundary of the juice communication passages 22 is formed by outlet openings 17 of the juice spaces 13. These outlet openings 17 are preferably arranged in the floor part 5. This means that the outer edge of the floor part 5, which is usually situated within the outer shell 1, is provided with holes, gaps or slots. The tower juice flowing into the juice space is able to pass via these outlet openings 17 into the juice communication passages 22. From there it flows directly into the juice ring channel 11 and from there to the outlet connection piece or outlet connection pieces 10 for the tower juice. The direction of flow is marked by a black arrow.

The juice space 13 above the outlet openings 17 arranged in the shape of a ring is bounded on its one side by the wall 25 of the outer shell 1 and on its other side by the side screens 12. In FIG. 2 this juice space 13 has a greater horizontal width than the juice communication passages 22, so that an increase in the flow rate is achieved. As already mentioned, the juice space 13 in most cases consists of a plurality of juice spaces 13. These juice spaces 13 result from the realisation of the side screens 12 as a frame construction. The frames 16 of this frame construction lie with their two vertical sides against the outer wall 25 of the outer shell 1. The side screens 12, together with the frames 16, form segment-like constructional units. The segments are arranged as segments of a circle distributed on the circumference of the outer shell 1. Each frame 16 carries and bounds a respective side screen 12.

The tower juice produced by the extraction process flows out of the interior 31 of the extraction tower through the side screens 12 into a respective juice space 13 and from there through the outlet openings 17 and the juice communication passages 22 into the juice ring channel 11. The tower juice can lastly be withdrawn from the outlet connection piece or outlet connection pieces 10. Directing the tower juice in this way guarantees good drawing-off of the juice without the danger of infection recesses. The tower juice is therefore unable to accumulate in recesses of the extraction tower.

The frames 16 of the side screens 12 can be withdrawn through openings 19 in the wall 25 of the outer shell 1. Preferably, after the frames 16 and therewith the side screens 12 have been taken out through the opening 19, the interior of the extraction tower can be rinsed or cleaned. The arrangement is in most cases designed such that the individual juice spaces 13 can be cleaned in sections.

Figure 3:
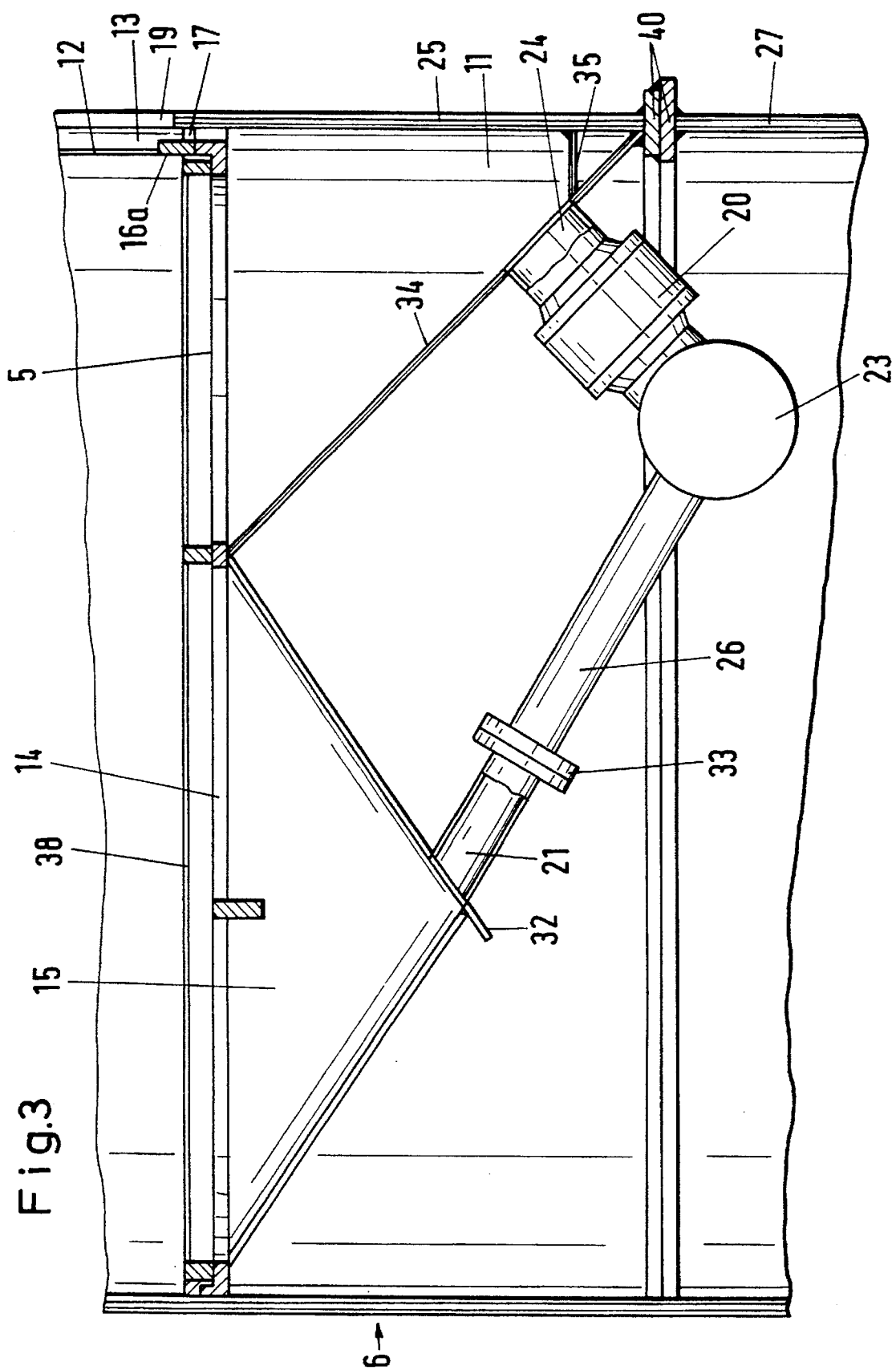

FIG. 3 is a detail sectional view of a second embodiment of the lower region of the outer wall 25 of an extraction tower. As in FIG. 1, the floor part 5 can be provided with floor openings 14. Through these floor openings 14, it is possible, if necessary, for residual quantities of solids obtained during the solid-liquid extraction, for example during the countercurrent extraction of beet cossettes, to sink into a collecting vessel 15 arranged therebelow. The collecting vessel 15 tapers downwardly in the shape of a bowl to a point. It has an opening 21 at its one wall 32. Fitted into this opening 21 is a pipe conduit 26. The latter leads to a ring conduit 23 located further below. Via a blocking element 33 in the pipe conduit 26, it is possible to bring about or control the withdrawal of the solid from the collecting vessel 15 via the pipe conduit 26 and the ring conduit 23. The quantity of solids flowing into the ring conduit 23 via the opening 21 is considerably smaller than the flow through the side screens 12.

The ring conduit 23 leads to one or more outlet connection pieces 10, not illustrated. From this outlet connection piece or these outlet connection pieces 10, the mixture of solids and tower juice can be withdrawn from the pipe conduit 26 or from the juice ring channel 11. As a connection to the juice ring channel 11, a blocking means 20, which is a slide in the present case, is arranged between an outflow opening 24 of the juice ring channel 11 and the ring conduit 23. A flap, a valve or the like can also be used as the blocking means 20. By means of the slide 20, the outflow opening 24 in the juice ring channel 11 can be blocked or at least partly blocked.

The juice ring channel 11 in FIG. 3 has a different shape than in FIG. 2. It extends over the entire circumference of the extraction tower. In FIG. 2, in contrast, it is composed of two halves. In profile, it appears triangular with a downwardly pointing vertex. On its one side it is bounded by the wall 25 of the outer shell 1. A wall 34 running obliquely with respect to this wall 25 bounds the juice ring channel 11 on its other side. Arranged horizontally at the height of the bottom of the outflow opening 24 is a supporting wall 35 running parallel to the floor part 5. The danger of an infection recess in the vertex of the triangle profile of the juice ring channel 11 thus no longer exists. As a result of the essentially smooth termination of the supporting wall 35 at the outflow opening 24 of the juice ring channel 11, the tower juice flows directly through the outflow opening 24 and the slide 20 into the ring conduit 23 and from them into the outlet connection piece or outlet connection pieces 10, not illustrated.

In place of only one slide 20 or one flap, in general a plurality of slides of flaps are arranged distributed over the circumference of the juice ring channel 11. The slides 20 or flaps can be selectively controlled or automatically regulated so that one or more slides are open and others closed. The consequence of this is a drawing-off, controllable in its direction, of solids and tower juice and hence an additional avoidance of deposits in the juice ring channel 11. Any disruption occurring in the extraction process can be compensated for. It is possible to rinse the juice or ring space 13 or the juice spaces in sections by pumping tower juice from above into the juice spaces 13 via conduits, which are not illustrated. As a result of the part of the outer wall 25 which terminates flush with the rest of the outer wall 25 and covers the opening 19, a complicated conduit system is no longer necessary in contrast to the known extraction towers having opening covers 19 mounted on from outside and sealed off by means of seals and distributed over the circumference of the tower. Since infection recesses or other deposition recesses are no longer presents the rinsing fluid is merely admitted through corresponding connection pieces into a level located above the juice spaces 13. The rinsing fluid finally passes, like the tower juice, through the outlet connection piece or outlet connection pieces 10 out of the tower again.

The floor part 5 is either fashioned completely smooth or equipped, for example, with segment-shaped sand drawing-off pockets 15 and covered in this region by a floor screen 38. The segment-shaped floor screen 38 is let into the floor part 5 so that a wiper 4b moving thereabove cannot catch on a part of the floor screen and tear it out. The otherwise smooth floor part 5 does not offer any engagement surface for catching the wipers 4b, in contrast to the known constructions having floor screens for drawing off the tower juice. The floor openings 14 underneath the floor screens 38 or in place of the floor screens 38 may themselves be of a slot type, hole type or screen type. Their task is to keep the solids which are too large away from the respective outlet opening 21 to prevent it from being clogged during the occasional emptying in place of slots and a single screen element 38, it is also possible to provide a plurality of small screen elements 38 let into the floor part 5.

The side screens 12 are fitted into frames 16. The respective frame 16 stands on the floor part 5. A lower part 16a of the frame 16 does not lie against the outer wall 25 of the shell 1. Through the remaining slot, the tower juice to be drawn off enters the juice ring channel 11 situated therebelow. As is more clearly visible in FIG. 4, the lateral, vertically running frame parts bear against the outer wall 25 of the outer shell 1 where they are fixed, for example screwed.

Arranged in the outer wall 25 of the outer shell 1 in the region of one individual side screen 12 is an opening 19 for cleaning, withdrawing and exchanging the screens 12 and for rinsing the juice space or juice spaces 13 and the juice ring channel 11. The opening 19 has the size of a manhole and is, moreover, dimensioned so large that the individual side screens 12 can be pushed one after the other in front of this opening 19 and withdrawn through this opening 19. They can also be mounted fixedly in the extraction tower, in which case a separate rinsing apparatus makes the cleaning possible. That part of the outer wall 25 which closes the opening 19 is preferably constructed as a single constructional unit with screen 12 and a frame 16, a whereby constructional unit is inserted into the outer shell 1 from outside and fixed therein. Instead of only one opening 19, two or more such openings 19 may also be provided as walk-in manholes.

In place of the outlet connection pieces 10 or within the latter, a withdrawal valve may also be provided. As with the above-mentioned slides 20 or flaps, this valve can be manually or automatically operated, controlled or regulated. The driving can be effected mechanically, electrically or hydraulically, for example by means of so-called proportional valves which are controlled or regulated electronically in dependence on a preset program and/or in dependence on measured values. In general, the tower juice is withdrawn continuously throughout. A regulation of the withdrawal quantity of the tower juice is, however, also possible.

In FIG. 3 two bearing and stiffening walls 40 or flanges, running all the way round in the shape of a ring at the outer wall 25 of the outer shell 1, are fitted into the extraction tower parallel to the floor part 5. They form the boundary between the outer shell 1 arranged at the top and the standing shell 6 arranged therebelow. By virtue of the walls 40, a larger bearing area is provided for the outer wall 25 of the outer shell 1 and an outer wall 27 of the standing shell 6. In addition, they stiffen the joint edge, running all the way round the extraction tower, of the two outer walls 25,27 of the shells 1,6. The walls 40 are each connected to the outer walls of the shells by welding and to one another either likewise by welding or screwing.

The obliquely running wall 34 of the juice ring channel 11 is supported on the walls 40. Costly floor-screen constructions having filigree floor screens, as is the case with the known extraction towers, are completely dispensed with in the case of the towers according to the invention. Instead, the floor part 5 is smooth and inherently rigid, essentially closed and load-carrying. Thus, the reliability or safety of the operation of the wipers 4b gliding over the floor part 5 and swirling up the solids settling there is vastly improved. On the one hand, the floor part 5 can be made thicker and more compact, and on the other hand, the wipers no longer get caught on any parts of the floor screens protruding from the floor.

The outer shell 1 can thus also be constructed and produced more simply and cost-effectively, since complicated fixing devices for the floor screens do not have to be provided, as is the case with the known towers. The compact, smooth, rigid and load-carrying floor part 5 is merely fitted into the outer shell 1 and connected, for example welded, to the latter.

The wear on the screen is relatively low due to the vertical installation position of the side screens 12 in frames 16 and the consequent low mechanical load. In general, large solids cannot damage the screens 12, since they settle on the floor part 5. As a result of the relatively low screen loads on the side screens 12, a stable or reliable functioning is also ensured.

Figure 4:
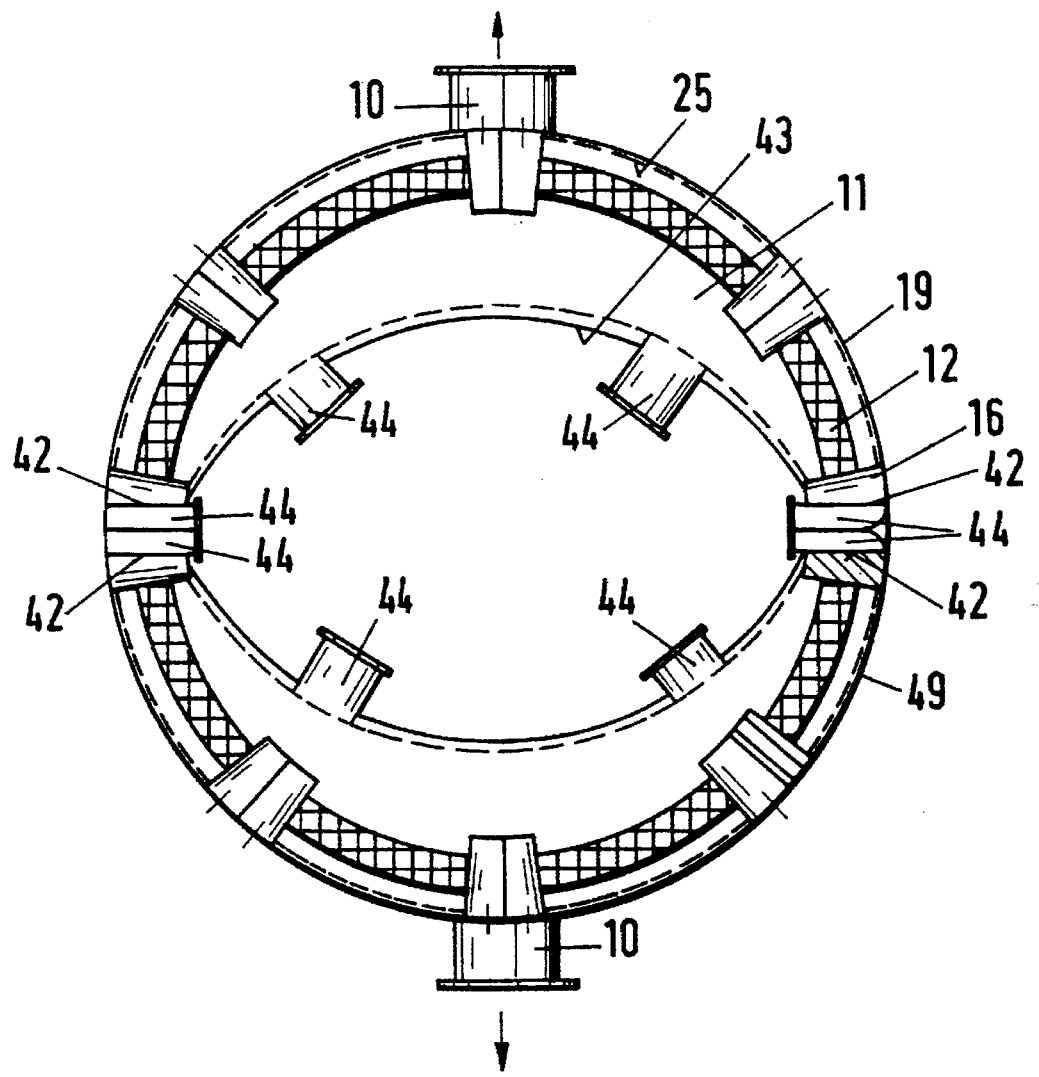
FIG. 4: shows a schematic cross-sectional view through a juice-ring channel according to FIG. 2, FIG. 5: shows a perspective view of a constructional unit including a side screen and a frame.

FIG. 4 shows a schematic cross-sectional view through the juice ring channel 11 in the lower region of the outer wall 25 of the extraction tower according to FIG. 2. A two-part juice ring channel 11 is illustrated. The two halves of the juice ring channel 11 abut against one another at their walls 42. From these walls 42, they run conically toward the respective centre between the respective two opposite walls 42. Instead of the lateral conical embodiment illustrated, a vertically conical shape may also be chosen. The conical shape arises from the requirement to avoid infection recesses. At the inaccessible narrow corners close to the walls 42, there thus prevails a greater flow rate, by virtue of the smaller cross-section. This compels any remaining solids there to be carried along. They are then no longer able to cause infections in the tower juice. Additionally, rinsing connection pieces 44 for rinsing the juice ring channel or juice ring channels 11 are provided in the region of the walls 42 and distributed on the circumference of the inner wall 43. The rinsing fluid fed in above the juice spaces 13 can be withdrawn, after the rinsing operation, through the two outlet connection pieces 10 arranged at a 90° angle to the walls 42.

The side screens 12 are arranged in the frames 16, preferably on edge one beside the other and distributed on the circumference of the extraction tower, and are each detachably connected, for example screwed, at their vertically running lateral parts to the outer wall of the outer shell 1. Preferably, countersunk head screws are used, which, since they do not protrude from the screen surface, cannot be sheared off by the wipers 4b. At least one of the side screens 12 forms a single structural or constructional unit with an associated part 49 of the outer wall 25 of the outer shell 1.

The part 49 is used to close the opening 19. Thus, when the opening 19 is opened, the screen is directly withdrawn as well and does not first have to be detached and inclined to be able to be withdrawn. Through this opening 19, which has the size of a manhole, the screwed connections of the adjacent side screens 12 in the frames 16 can be reached and detached from inside. After detaching the screws, the individual screens 12 can be pushed, together with frames 16, to the opening 19 and withdrawn through the latter.

Figure 5:
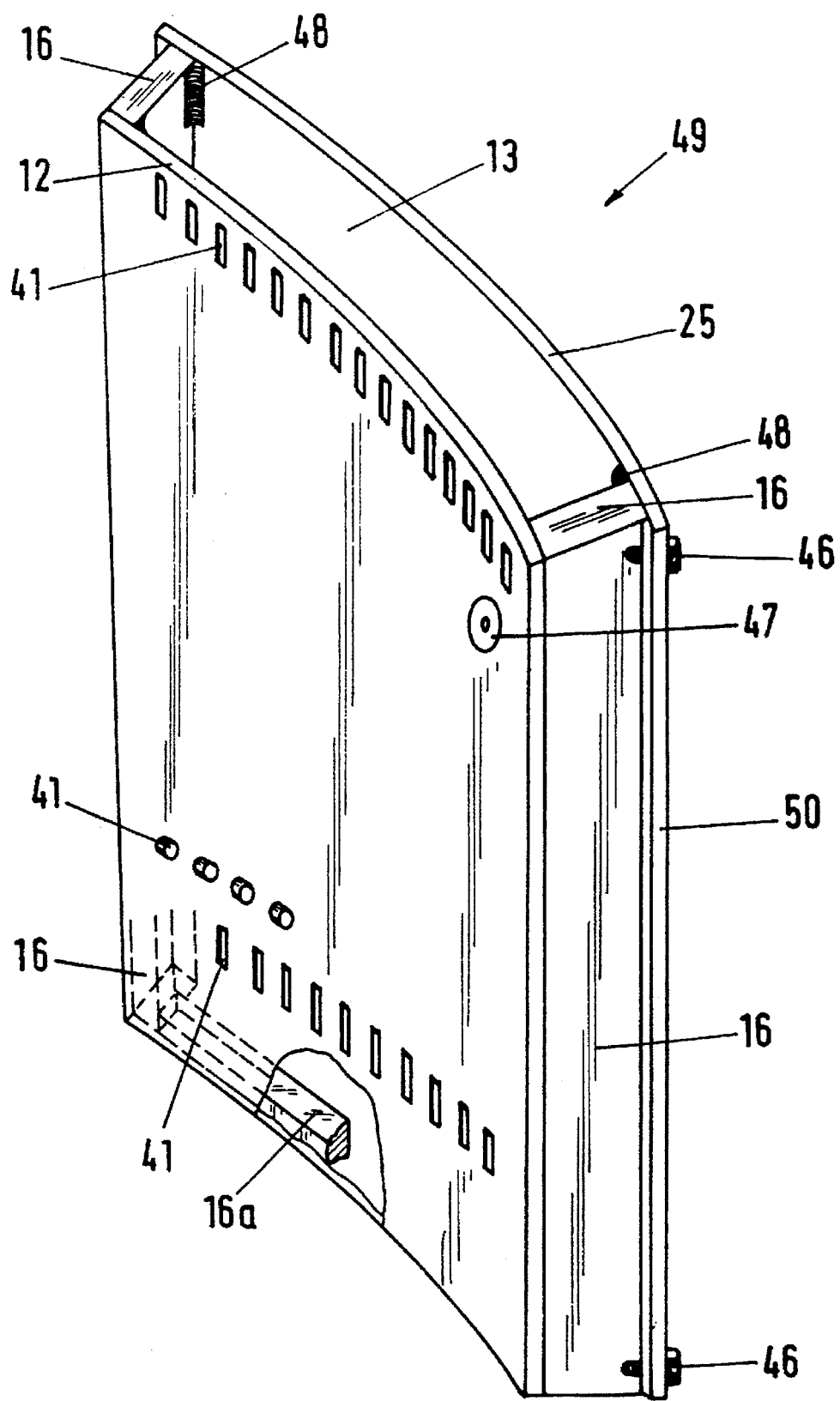

FIG. 5 shows, in principle, a perspective view of a constructional unit of a side screen 12 and a frame 16. The side screen 12 is non-detachably connected to the frame 16 and detachably connected to the outer wall 25 of the outer shell 1. Possibilities for connection which are conceivable are, for example, screwing, stapling, soldering or welding. Here, the screen 12 is connected to the frame 16 by means of welding. Countersunk screws 47 connect the vertically running beams of the frame 16 to the outer wall 25 of the outer shell 1. In the case of this connection, either a lock nut can be placed onto a screw 47 from outside, or the screw 47 is tightened in a threaded hole in the sheet metal of the outer wall 25. Another possibility of connecting the frames 16 to the outer wall 25 of the outer shell 1 is to weld the parts. In FIG. 5 this is indicated by a weld seam 48. This type of connection lends itself to the part 49 which, as a constructional unit of screen 12, frame 16 and the wall piece 49 of the outer wall 25, can be withdrawn from the extraction tower. The screwing of the screens 12 and frames 16 by means of countersunk screws to the outer wall 25 of the outer shell 1 lends itself, in contrast, to the remaining screen elements. Thus, it is possible to avoid the use of costly seals, which are conventionally used to seal cover plates that are screwed on from the outside of the known extraction towers. Also, only one or two openings 19 are provided as manholes. The construction is thus considerably simplified, above all with regard to the sealing-off of the openings 19, since the screens 12 in the frames 16 fixedly connected thereto are pushed in from an opening 19. This opening 19 is subsequently closed again by means of the part 49 of the outer wall 25.

Further screws 46 may be provided to connect the part 49 of the outer wall 25 to the rest of the wall 25. For this, the screws 46 are arranged at edges 50 of the part 49 which project beyond the vertical beams of the frame 16. In FIG. 5, at the top and bottom in the corners of the edges 50, a screw 46 is arranged in each case.

The openings 41 of the screen 12 may be distributed uniformly over the width of the screen 12 as shown in the upper region in screen 12 in the schematic diagram of FIG. 5. On the other hand, they may also, as be arranged irregularly and distributed over the width of the screen 12 as shown in the lower part of the screen 12 in FIG. 5. In the case of the screen openings becoming ever larger in the direction of rotation, solid particles which would otherwise become lodged in the screen 12 are directed or forced by means of the wiper or wipers, in the direction of rotation, towards the larger opening widths and thus carried out. The shape of the screen openings can be selected as desired and adapted to requirements. It may, for example, be round, oval or slot-like. Preferably, so-called bar screens are employed as screens 12, as illustrated by way of example in FIG. 6.

Apart from the two vertical beams, the frame 16 has a transverse beam 16a at least at its lower side. This beam 16a is narrower than the other two beams 16a and is connected only to the other two beams 16 and the screen 12. At this beam 16a, the tower juice flows out of the juice space 13 that is formed by the screen 12, the vertical beams of the frame 16 and the outer wall 25, and from there flows into the juice ring channel 11, not illustrated here, located therebelow. For this reason, the transverse beam 16a may be cuboid-shaped on the one hand, or may be furnished with an obliquely downwardly pointing top edge on the other hand. The latter points in the direction of flow of the tower juice to be drawn off. In place of the angular shape, a round one may also be chosen, for example in the case of bar screens in which the screen bars are flattened round rods joined together.

Figure 6:
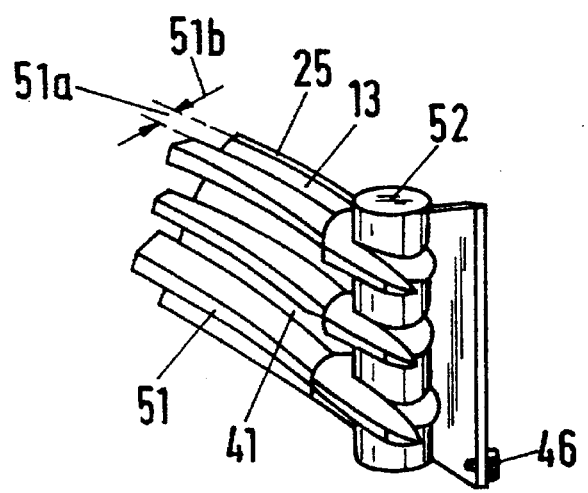
FIG. 6: shows a perspective detail view of a side screen realised as a bar screen.

FIG. 6 shows a perspective detail view of a bar screen in which the lateral frame 16 is omitted in order to show the screen structure more clearly. The screen openings 41 are arranged in the form of gaps between horizontal bars 51. The gap width of the screen openings 41 is dimensioned to vary over the length of the screen. The gap width is preferably dimensioned to become greater toward the juice space 13 and in the direction of rotation, in order that solids which are carried out with the tower juice are not able to become lodged in the screen openings 41. The screen bars 51 exhibit double conicity. The screen bars 51 are fixed laterally in the frame 16, which is not illustrated here. On their rear side, the screen bars 51 are connected to one another by means of a bolt 52 onto which they are wound, for example. The fabrication of the bar screens is effected, for example, by flattening round rods 51 wound one beside the other onto bolts 52. The mutual distances between the screen bars 51 are enlarged for the sake of clarity in the illustration. In practice the spacings are determined by the actual requirements and set by the distances on the bolts 52. These distances can be obtained and fixedly set by washers, distance rings or by means of grooves provided in the bolts. The vertically standing frames 16 can be joined to the side faces of the bolts 52, for example by means of welding. In this case, the bolts 52 have a smaller width than the frames 16, which are not depicted in FIG. 6 for reasons of clarity. For this reason, they do not reach up to the outer wall 25 of the outer shell 1, as indicated in FIG. 6 by gap of the interval 51a and the arrows 51b.

The bolts 52 may also serve as frames 16 when the juice space 13 does not have to be closed off from the laterally adjoining juice spaces. In this case, namely, the distance of the screen bars 51 from the outer wall 25, which determined by the bolts 52 and, where appropriate, distance pieces, not illustrated, is sufficient to guarantee the outflow of the screened tower juice from the juice space 13 into the juice communication passage 22 located therebelow. Where an additional frame 16 or additional distance pieces are used, the interval 51a can be increased or be dimensioned to vary over the length of the bolt 52.

Although the invention has been described with reference with specific example embodiments it will be appreciated that it is intended to cover all modifications and equivalents within the scope of the appended claims.

We claim:

1. An extraction tower for solid-liquid countercurrent extraction of an extract from a solid raw material, said extraction tower comprising a tower wall and a tower floor bounding an internal space, an introduction port for an extractant liquid and an introduction port for a raw material respectively opening into said internal space at different locations for a countercurrent flow of said raw material relative to said extractant liquid, and a side screen through which a tower juice containing said extract can flow out of said internal space and which is arranged near said tower wall within said internal space, wherein said tower floor comprises a floor pan that is substantially non-perforated, rigid and load-carrying.

2. The extraction tower of claim 1, wherein said side screen is arranged to extend substantially uniformly spaced away from said tower wall and forms a juice flow space between said screen and said tower wall.

3. The extraction tower of claim 2, wherein said tower wall is a substantially cylindrical shell, and comprising a plurality of said side screens, which are arranged around an inner circumference of said tower wall to form an inner wall of said tower, and wherein said juice flow space is an annular ring space between said side screens and said tower wall around said inner circumference of said tower wall.

4. The extraction tower of claim 2, further comprising a plurality of juice outlets communicating said juice flow space to the outside of said tower.

5. The extraction tower of claim 4, wherein said juice outlets have opening cross-sections selected so that said tower juice can be drawn off at an approximately uniform flow rate.

6. The extraction tower of claim 4, wherein said juice flow space is an annular ring space and said juice outlets are arranged in a ring pattern along said juice flow space, and further comprising a ring-shaped juice channel arranged below said juice flow space, and a plurality of juice communication passages connecting said juice outlets to said ring-shaped juice channel.

7. The extraction tower of claim 6, further comprising a ring-shaped conduit connected to said ring-shaped juice channel downstream of said juice channel.

8. The extraction tower of claim 7, further comprising a recessed collection pocket for fine solids that were introduced through said raw material introduction port, wherein said collection pocket is arranged on said floor pan, and wherein said collection pocket is connected for flow of said fine solids to said ring-shaped conduit.

9. The extraction tower of claim 7, wherein said juice flow space, said juice outlets, said ring-shaped juice channel, said juice communication passages and said ring-shaped conduit are all shaped so as to provide gravitational flow drainage therefrom and avoid dead recesses where puddling of said tower juice would occur.

10. The extraction tower of claim 6, further comprising a plurality of second juice outlets arranged on said juice channel, and a flow blocking device arranged downstream from said juice outlets of said juice space or downstream from said second juice outlets of said juice channel.

11. The extraction tower of claim 10, wherein said flow blocking device comprises at least one member selected from the group consisting of slides and flaps.

12. The extraction tower of claim 10, wherein a plurality of said flow blocking devices are arranged distributed along a circumference of said ring-shaped juice channel.

13. The extraction tower of claim 6, wherein said juice flow space has a first cross-sectional flow area, and said juice channel has a second cross-sectional flow area that is larger than said first cross-sectional flow area.

14. The extraction tower of claim 1, further comprising a screen frame arranged between said side screen and said tower wall, wherein said side screen is mounted on said frame and said frame connects said side screen to said tower wall.

15. The extraction tower of claim 14, wherein said frame defines a spacing distance between said screen and said tower wall and forms lateral boundaries of a juice flow space that is formed in said spacing distance between said screen and said tower wall, and wherein said tower wall has a closeable manhole therein allowing access to said internal space of said tower and said side screen.

16. The extraction tower of claim 15, wherein said tower wall comprises a removable wall panel that is removably arranged to close said manhole, and wherein said side screen and said frame are mounted on said removable wall panel to form a single structural unit thereof.

17. The extraction tower of claim 1, wherein said floor pan comprises a recessed collection pocket for fine solids that were introduced through said raw material introduction port.

18. The extraction tower of claim 17, wherein said floor pan is substantially circular and said recessed collection pocket has the shape of a segment of said substantially circular floor pan.

19. The extraction tower of claim 17, wherein said floor pan has slot-shaped openings therethrough opening into said recessed collection pocket.

20. The extraction tower of claim 17, wherein said floor pan has a screened opening therethrough that opens into said recessed collection pocket.

21. The extraction tower of claim 17, wherein said floor pan is completely solid and non-perforated except for said recessed collection pocket and said raw material introduction port which each respectively open into said internal space through said floor pan.

22. The extraction tower of claim 1, wherein said side screen comprises a peripheral frame including side members, a top member and a bottom member mounted on an inner side of said tower wall, and a screen element mounted on said peripheral frame to define a juice flow space between said screen element and said wall, wherein at least one juice communication passage is provided through said bottom member of said frame, and wherein said screen has a cylindrical segment shape.

23. The extraction tower of claim 22, wherein said juice communication passage is provided along an outer edge of said bottom member of said frame facing against said tower wall.

24. The extraction tower of claim 22, further comprising a removable wall panel of said tower wall that is inserted in an opening of said tower wall, wherein said frame is mounted on an inner side of said removable wall panel.

25. The extraction tower of claim 11, wherein said side screen has openings of a size sufficient to allow fine solids that were introduced through said raw material introduction port to pass therethrough.

26. The extraction tower of claim 1, wherein said side screen has openings with opening sizes that increase in a circumferential direction.

27. The extraction tower of claim 1, wherein said side screen is arranged only at a bottom portion of said tower wall proximately above said floor pan and not at an upper portion of said tower wall.

28. The extraction tower of claim 1, wherein said side screen is substantially vertically cylindrically oriented, and is fixed in position relative to said tower wall.

29. The extraction tower of claim 1, further comprising a conveyor shaft rotatably arranged within said internal space with an axis of said shaft extending substantially vertically, a plurality of conveyor fins mounted along said shaft and extending radially outwardly therefrom, and a floor wiper arranged on one of said conveyor fins proximate to said floor pan so that said floor wiper wipingly contacts said floor pan.

30. The extraction tower of claim 29, further comprising a screen wiper arranged on one of said conveyor fins proximate to said side screen so that said screen wiper wipingly contacts said side screen.

31. The extraction tower of claim 1, wherein said raw material introduction port is arranged near a bottom of said tower, and further comprising a processed material outlet port arranged near a top of said tower.

32. The extraction tower of claim 31, wherein said raw material introduction port opens into said internal space through said floor pan.

33. The extraction tower of claim 31, wherein said liquid introduction port is arranged near a middle of a height of said tower.

34. The extraction tower of claim 1, wherein said side screen extends substantially vertically and substantially parallel to said tower wall.

35. A method of using the extraction tower of claim 1 for solid-liquid countercurrent extraction of said extract from said solid raw material, comprising the following steps:

(a) introducing said extractant liquid into said tower through said extractant liquid introduction port, and causing said liquid to move in a first net direction in said tower;

(b) introducing said raw material and fine solids into said tower through said raw material introduction port and causing said raw material to move in a second net direction in said tower opposite said first direction, wherein said extractant liquid extracts said extract from said raw material to form said tower juice; and (c) separating said tower juice and said fine solids from said raw material, and withdrawing at least essentially all of said tower juice and at least some of said fine solids from said tower through said side screens.

* * * * *

UNITED STATES PATENT AND TRADEMARK OFFICE
CERTIFICATE OF CORRECTION

PATENT NO. : 5,653,815

DATED : Aug. 5, 1997

INVENTOR(S) : Hartmann et al.

It is certified that error appears in the above-identified patent and that said Letters Patent is hereby corrected as shown below:

| | | |
|---|---|---|
| Col. 2, | line 9, | after "flow" insert --,--. |
| Col. 5, | line 1, | after "25" insert --,--; |
| | line 31, | after "tower." insert a paragraph spacing; |
| | line 57, | after "screens." insert a paragraph spacing. |
| Col. 6, | line 15, | after "forms" insert --,--; |
| | line 39, | after "horizontal" delete ",". |
| Col. 8, | line 1, | replace "presents" by --present,--; |
| | line 46, | after "with" insert --a--. |
| Col. 10, | line 50, | delete "as"; |
| | line 64, | replace "16a" by --16--. |
| Col. 11, | line 37, | replace "of" by --or--; |
| | line 38, | after "arrows 51b." insert --Such bar screens which are suitable for the screens 12 are the state of the art.--; |
| | line 42, | after "which" insert --is--; |
| | line 51, | replace "with" by --to--. |
| Col. 13, | line 42, | replace "claim 11," by --claim 1,--. |

Column 8, line 46, delete "a"(2nd occurrence)

Signed and Sealed this

Twenty-fifth Day of November, 1997

*Attest:*

BRUCE LEHMAN

*Attesting Officer*     Commissioner of Patents and Trademarks